UNITED STATES PATENT OFFICE.

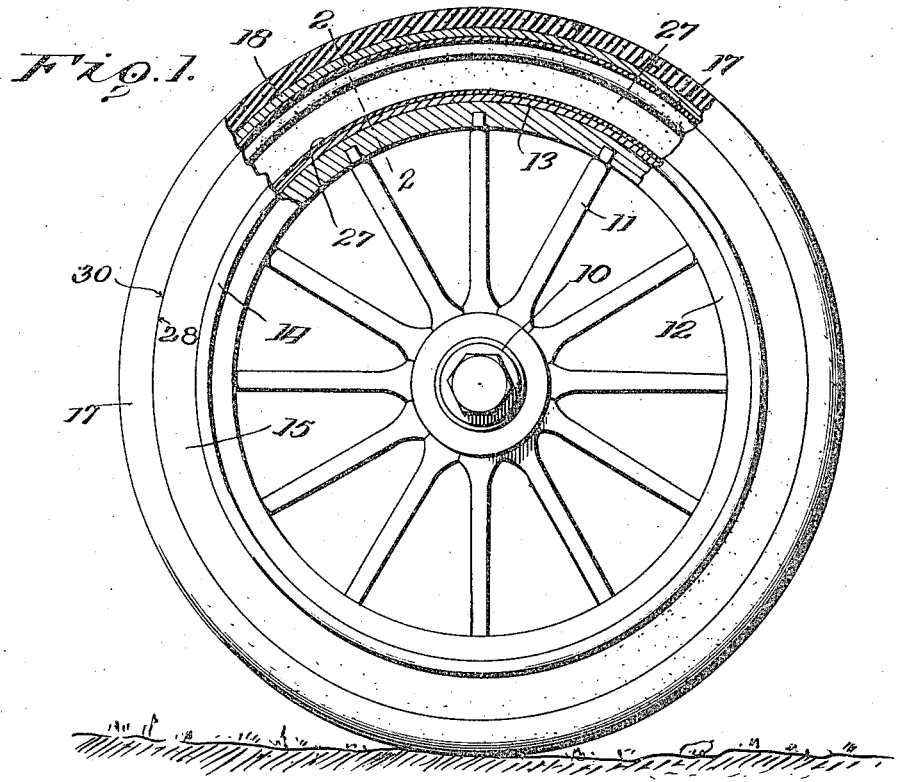
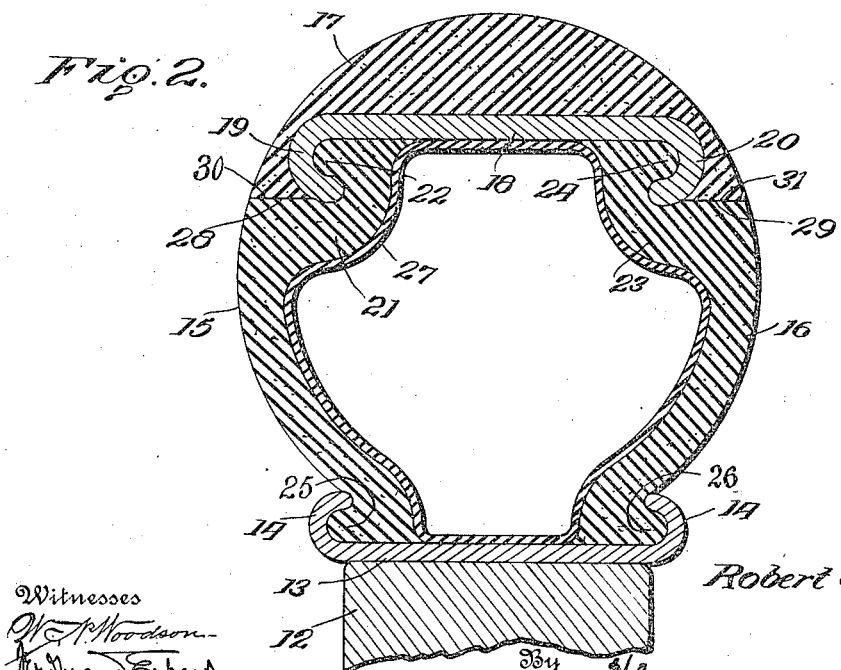

ROBERT J. WYNN, OF SAULT STE. MARIE, MICHIGAN.

PNEUMATIC TIRE.

1,068,619.  Specification of Letters Patent.  Patented July 29, 1913.

Application filed February 10, 1912. Serial No. 676,757.

*To all whom it may concern:*

Be it known that I, ROBERT J. WYNN, citizen of the United States, residing at Sault Ste. Marie, in the county of Chippewa and State of Michigan, have invented certain new and useful Improvements in Pneumatic Tires, of which the following is a specification.

This invention relates to pneumatic tires for automobiles and like vehicles, and has for one of its objects to provide a simply constructed device formed of a plurality of separable parts so that in event of breakage or impairment, one part may be detached without discarding the remaining parts.

Another object of the invention is to provide a simply constructed device whereby the inner expansible tube may be readily detached without removing the tire wholly from the rim.

Another object of the invention is to provide a simply constructed device so arranged and constructed that the parts coact to mutually support each other and prevent deflection when strains are applied either radially or transversely.

With these and other objects in view, the invention consists in certain novel features of construction as hereafter shown and described, and then specifically pointed out in the claim, and in the drawings illustrative of the preferred embodiment of the invention: Figure 1 is a side elevation of a wheel with the improved tire applied and partly in section; Fig. 2 is a transverse section enlarged on the line 2—2 of Fig. 1.

Corresponding and like parts are referred to in the following description and indicated in all the views of the drawings by the same reference characters.

The improved tire may be applied without material structural change to any of the various forms of automobile wheel fellies and rims, but for the purpose of illustration is shown applied to a conventional wheel including the hub 10, spokes 11, felly 12 and main rim 13, the latter having the inturned clencher flanges 14 of the usual form.

The body of the tire is formed of four separate portions, two main side portions 15—16, an outer or tread portion 17, and a supplemental or outer clencher rim 18, the latter having inturned clencher flanges 19—20, as shown. The tread portion 17 bears around the outer faces of the clencher flanges 19 of the supplemental rim and is vulcanized thereto. The side member 15 of the tire is formed with an inwardly directed outer portion 21 which conforms to and engages within the clencher rim 19, as shown at 22, while the side member 16 is inwardly directed at its outer portion as shown at 23, and with an inwardly directed terminal 24 engaging within the clencher flange 20. At its inner end the side member 15 is provided with a clencher flange 25 engaging one of the flanges 14 of the main clencher rim, while the side member 16 is provided with a clench flange 26 engaging the other flange of the main clencher rim. The inner tube is represented at 27, and conforms to the interior of the members 15—16 and 18, as shown.

At their outer ends the members 15—16 are flattened as shown at 28—29 while the inner ends of the tread member 17 are correspondingly flattened as shown at 30—31, the flattened surfaces extending in parallel relations to the rims 13 and 18 and coacting to mutually support the members and prevent separation thereof under the severe strains to which they will be subjected when in use. It will be noted also that the inwardly directed portions 21—23 of the side members of the tire materially enlarge and strengthen them at the points where the greatest strains occur and coact with the flattened faces to still further increase the efficiency and utility. By this simple means it will be obvious that a three-part tire is produced with the adjacent edges united by the clencher flanges of the member 18, and two of the tire members united in the ordinary manner to the main clencher rim 13. The members 15—16—17 will be constructed of the usual material employed in pneumatic tires, while the members 13—18 together with their clencher flanges are likewise formed of the usual material preferably steel.

The improved device is simple in construction, can be inexpensively manufactured and applied, and materially increases the efficiency and utility of the tire, while at the same time materially decreases the expense of the renewal of worn or impaired tires. The tread portion 17 receiving the greatest wear may be renewed at comparatively small expense, while the side portions 15—16 which do not generally receive heavy abrasion or wear, will outlast a number of the tread portions. The expense of renewing the tire is therefore materially decreased.

The improved tire may be constructed of any required size to fit wheels of different forms and sizes, may be employed either in the single tread wheels such as are commonly employed upon automobiles, but is likewise adapted without material structural change to the twin tires of auto trucks and like heavy vehicles. The parts 15—16 are precisely alike and are therefore interchangeable.

Having thus described the invention, what is claimed as new is:

A tire comprising side sections provided with stepped edges formed with plane surfaces, the lower surfaces of the sections being in alinement with each other, and the upper surfaces of the sections being in alinement with each other, said upper and lower surfaces being disposed in parallel relation, the portions of the sections between the stepped edges being curved inwardly adjacent the lower surfaces and outwardly adjacent the upper surfaces, and a tread section formed with stepped plane surfaces disposed to contact with the stepped plane surfaces of the side sections, a flat member supported by the tread section, the edges of said member being curved to embrace the portion of the sections intermediate the stepped plane surfaces, the tread section and side sections, when assembled, forming a continuous surface spherical in cross section.

In testimony whereof I affix my signature in presence of two witnesses.

ROBERT J. WYNN. [L. S.]

Witnesses:
 FRANK P. SULLIVAN,
 H. B. McMAHON.

Copies of this patent may be obtained for five cents each, by addressing the "Commissioner of Patents, Washington, D. C."